Reissued May 2, 1939

Re. 21,064

UNITED STATES PATENT OFFICE 21,064

PROCESS FOR PURIFYING HORMONES

Max Hartmann, Riehen, near Basel, and Albert Wettstein, Basel, Switzerland, assignors to the firm Society of Chemical Industry in Basle, Basel, Switzerland No Drawing. Original No. 2,062,904, dated December 1, 1936, Serial No. 741,504, August 25, 1934. Application for reissue September 6, 1938, Serial No. 228,636. In Switzerland September 6, 1933

10 Claims. (Cl. 260—397)

The present invention relates to a process for purifying the hormones of the corpus luteum. According to the invention a preparation containing the hormones is caused to react with a specific reagent for the keto group, the product of the reaction is separated from the portion which has not reacted by means of solvents and is then decomposed by hydrolyzing agents in order to liberate the hormone.

As specific reagents for the keto group there may be used, for example, bisulphite, hydroxylamine or hydrazine or derivatives thereof, such as semi-carbazide, phenyl-hydrazine sulfonic acid and the like.

The separation of the reaction product from the ballast substances which have not entered into reaction is complete in cases in which the two classes of bodies have very different properties of solubility. After splitting off the keto reagent from the reaction product the hormones of the corpus luteum are generally obtained already in crystalline form. If required, the crystals can be further purified by recrystallization, by a further reaction with a specific keto reagent, such as hydroxylamine, or by sublimation in a high vacuum.

The following examples illustrate the invention:

*Example 1*

A purified preparation is obtained from corpora lutea by alcoholic extraction, conversion of the extract first in ether and then in acetone, treatment of the acetone residue with cold methyl alcohol of 70 per cent. strength, subsequent conversion in sulfuric acid of 75 per cent. strength and precipitation with water. 2.5 grams of this purified preparation are dissolved in 60 cc. of absolute alcohol and the solution is boiled for 2 hours together with a solution of 2.23 grams of semi-carbazide hydrochloride and 2.72 grams of crystallized sodium acetate in 40 cc. of water. After the reaction mixture has been allowed to stand for some time in the cold the precipitate is filtered with suction and for purification is extracted repeatedly first with aqueous alcohol and then with absolute alcohol. The semi-carbazone so obtained is dissolved in 6 cc. of glacial acetic acid, 80 cc. of sulfuric acid of 20 per cent. strength are added and the whole is heated on a boiling water bath with frequent shaking. During this operation crystalline needles, which are soluble in ether, are formed. By extracting the reaction mixture with ether and evaporating the ethereal extract to dryness the hormone is obtained in crude crystalline form; it may be separated into its constituents by repeated recrystallization.

*Example 2*

A purified preparation is obtained from corpora lutea by alcoholic extraction, conversion of the extract first in ether and then in acetone, treatment of the acetone residue with cold methyl alcohol of 70 per cent. strength, subsequent conversion in ether and shaking out with saturated aqueous sodium bicarbonate. 4.16 grams of this purified preparation are dissolved in 100 cc. of absolute alcohol and the solution is heated to boiling for 3 hours together with a solution of 2.8 grams of hydroxylamine hydrochloride and 5.6 grams of crystallized sodium acetate in 60 cc. of water. The reaction mixture is then concentrated to about 50 cc. The viscous oil which separates on concentration is first extracted repeatedly with water in order to remove inorganic admixtures and is then dissolved in a small quantity of hot methyl alcohol and the solution is mixed with water until turbidity appears. On allowing the whole to stand in the cold a crude oxime crystallizes. Further quantities of the oxime can be obtained from the mother liquor.

The crude oxime may be recrystallized from dilute or absolute alcohol. There can thus be obtained a preparation of melting point 240° C. which, according to the results of analysis, is a dioxime. If required, however, it can be separated by further recrystallization into two dioximes having higher melting points.

For saponification the oxime is introduced, for example, into hot hydrochloric acid of 15 per cent. strength, the whole is heated on a boiling water bath for some time and is then exhaustively extracted with ether. By evaporating the ethereal extract to dryness and subjecting the residue to recrystallization or to sublimation in a high vacuum there are obtained the highly active diketone compounds corresponding with the dioximes.

From the mother liquors, obtained in the recrystallization of the dioximes, there may be obtained, by saponification, in an analogous manner, preparations having the character of an oxyketone.

*Example 3*

300 mgs. of a preparation purified as described in Example 2 are dissolved in 10 cc. of methyl alcohol together with 300 mgs. of phenyl-hydrazine and 0.4 cc. of glacial acetic acid and the whole is heated for 2 hours on a boiling water bath. Water is then cautiously added to the reaction mixture, whilst still hot, until turbidity appears and the whole is then allowed to stand for a long time in the cold. The crude phenylhydrazone which separates is filtered with suction and a further quantity is recovered from the mother liquor by concentration. It can be recrystallized from ethyl-alcohol or methyl-alcohol and decomposed by heating with dilute acid analogously to the crude oxime described in the preceding example.

In a similar manner there may be obtained, by means of para-nitrophenyl hydrazine, a somewhat more sparingly soluble dark, brick-red para-nitrophenyl hydrazone.

*Example 4*

100 mgs. of a preparation purified as described in Example 2 are dissolved in 50 cc. of ether free from peroxides and the ethereal solution is shaken vigorously five times with a solution of sodium bisulfite, 20 cc. being used in each operation. After each operation the aqueous layer is separated from the ethereal layer by means of a separating funnel. On evaporation of the ethereal solution there remains a yellowish oil. The bisulfite solutions are combined, heated with dilute acid, whilst passing nitrogen through the liquid and then extracted with ether. By concentration of the ethereal extract the hormones are obtained in purified form.

*Example 5*

A purified preparation is obtained from corpora lutea by alcoholic extraction, conversion of the extract first in ether and then in acetone, adsorption of the active parts with animal charcoal from a solution of the preparation in ethyl-acetate, and extraction of the adsorbate by means of a mixture consisting of methyl alcohol and chloroform. 100 mgs. of this purified preparation are dissolved together with 150 mgs. of phenyl-hydrazine-4-sulfonic acid in 20 cc. of alcohol of 60 per cent. strength by volume. The solution is heated to boiling for some time and the greater part of the alcohol is then removed by distillation under reduced pressure and the aqueous residue is extracted repeatedly with ether. By evaporating the combined ethereal extracts there is obtained a pale yellow oil which is practically completely inactive. The aqueous portion, however, after having been heated with the addition of acid, yields an ethereal extract containing the purified hormones.

What we claim is:

1. Process for purifying the hormones of the corpus luteum, which comprises causing a preparation containing the hormones to react with a specific reagent for the keto group, separating the reaction product from the portions which have not reacted by means of solvents and decomposing it by hydrolyzing agents in order to liberate the hormones.

2. Process for purifying the hormones of the corpus luteum, which comprises causing a preparation containing the hormones to react with a specific reagent for the keto group forming water-insoluble compounds, separating the reaction product from the portions which have not reacted by means of solvents and decomposing it by hydrolyzing agents in order to liberate the hormones.

3. Process for purifying the hormones of the corpus luteum, which comprises causing a preparation containing the hormones to react with a specific reagent for the keto group forming water-soluble compounds, separating the reaction product from the portions which have not reacted by means of solvents and decomposing it by hydrolyzing agents in order to liberate the hormones.

4. Process for purifying the hormones of the corpus luteum, which comprises causing a preparation containing the hormones to react with a hydrazine reagent for the keto group, separating the reaction product from the portions which have not reacted by means of solvents and decomposing it by hydrolyzing agents in order to liberate the hormones.

5. Process for purifying the hormones of the corpus luteum, which comprises causing a preparation containing the hormones to react with a phenyl-hydrazine reagent for the keto group, separating the reaction product from the portions which have not reacted by means of solvents and decomposing it by hydrolyzing agents in order to liberate the hormones.

6. Process for purifying the hormones of the corpus luteum, which comprises causing a preparation containing the hormones to react with phenyl-hydrazine-sulfonic acid, separating the reaction product from the portions which have not reacted by means of solvents and decomposing it by hydrolyzing agents in order to liberate the hormones.

7. Process for purifying the hormones of the corpus luteum, which comprises causing a preparation containing the hormones to react with semi-carbazide, separating the reaction product from the portions which have not reacted by means of solvents and decomposing it by hydrolyzing agents in order to liberate the hormones.

8. Process for purifying the hormones of the corpus luteum, which comprises causing a preparation containing the hormones to react with hydroxylamine, separating the reaction product from the portions which have not reacted by means of solvents and decomposing it by hydrolyzing agents in order to liberate the hormones.

9. Process for the manufacture of corpus luteum hormones, comprising treating functional keto-derivatives of the corpus luteum hormones with hydrolyzing agents in order to liberate the hormones.

10. Process for the manufacture of corpus luteum hormones comprising treating corpus luteum hormone oxime with hydrolyzing agents in order to liberate the hormones.

MAX HARTMANN.
ALBERT WETTSTEIN.